April 8, 1969 L. J. BIELINSKI 3,437,088
APPARATUS FOR MEASURING MOTILITY OF BODY ORGANS
Filed Dec. 1, 1966
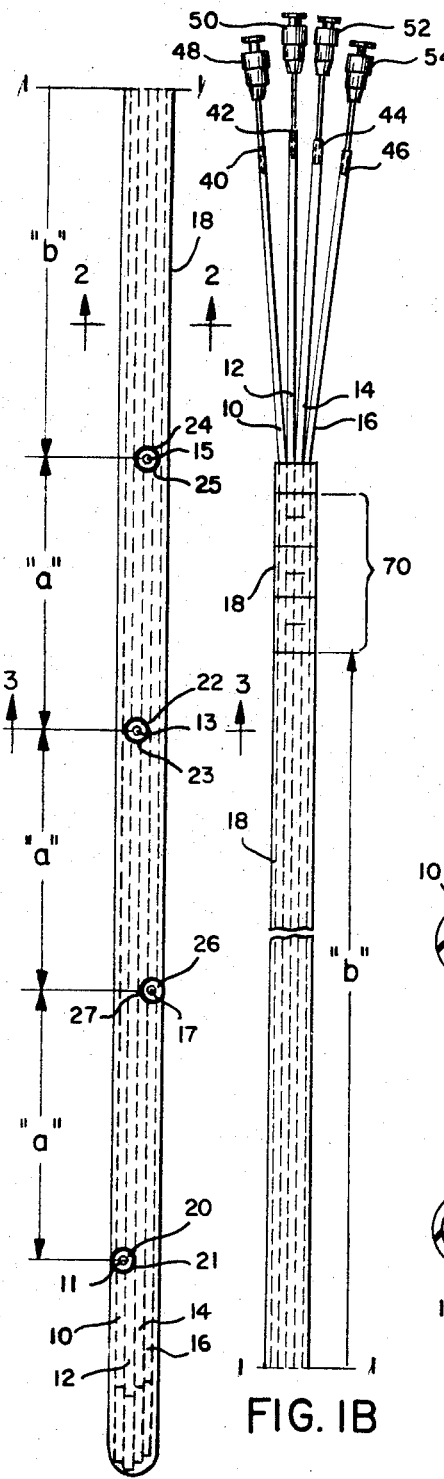
FIG. 1A
FIG. 1B
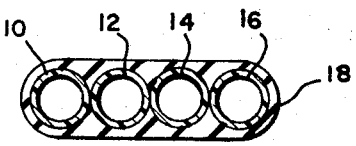
FIG.2
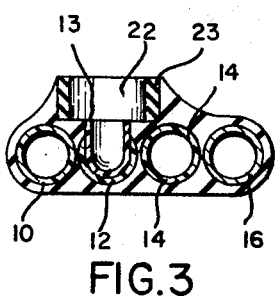
FIG.3
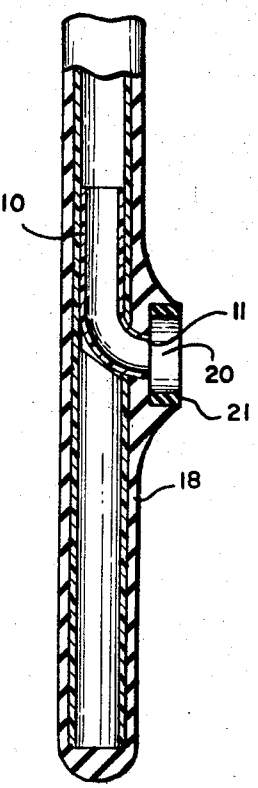
FIG.4
INVENTOR
LEONARD J. BIELINSKI
By RONALD E. BARRY
Attorney

United States Patent Office 3,437,088
Patented Apr. 8, 1969

3,437,088
APPARATUS FOR MEASURING MOTILITY OF BODY ORGANS
Leonard J. Bielinski, 812 E. 18th St., Marshfield, Wis. 54449
Filed Dec. 1, 1966, Ser. No. 598,427
Int. Cl. A61b 5/10; G01l 7/00; A61m 25/00
U.S. Cl. 128—2
5 Claims This invention relates to devices used to test the operation of the various functional systems of the human body and more particularly to a device for making esophageal motility studies.

The esophageal motility test is performed on patients who exhibit symptoms which could be related to diseases in the esophagus or the valves or sphincters at either end. These tests are based on the pressures, lengths and speed of the peristaltic waves which pass down the esophagus after each swallow. There has been some confusion in the interpretation of the results of the tests limiting their value to the diagnosis of only four to six easily diagnosed diseases. This confusion seems to be related to the limited information presently being obtained from such devices.

One of the primary objects of the present invention is to provide an improved device for making esophageal motility studies and motility studies in other suitable body organs.

Another object of the present invention is to provide a device which can be manufactured at low cost for making motility studies.

A still further object is to provide an improved device for making motility studies which can be accurately located in the patient.

A still further object of the present invention is to provide an improved motility device that will provide accurate indications of the motion and pressure of the peristaltic waves in the esophagus of the patient.

Another object of the present invention is to provide a device for making motility studies which is uneffected by foreign pressures.

These objects are attained by embedding a number of catheters in a semi-rigid flat tape with one end of each catheter terminating in an opening in one surface of the tape. The openings are each spaced at predetermined distances along the tape and are approximately eight times as large as the opening in the catheters. The opposite ends of the catheters are each connected to a transducer that responds to pressure fluctuations of the peristaltic waves or sphincters. These responses are amplified and seen on an oscilloscope and recorded on a photographic recorder. The tape is calibrated throughout its length so that the distance of the openings in the tape to the patient's incisors is always known. A common reference point is marked on the tape and is aligned with the incisors of the patient. The distance of the opening from the incisors will then be known and recorded on the oscilloscope and a recorder for each test. The tape is then removed and a second set of distances recorded. Another test is then run. This procedure can be repeated any number of times until a pattern for the peristaltic waves in the entire esophagus and sphincter areas and their pressures has been established.

The tape is swallowed by the patient sitting up, with the openings or wells down. After the tape has been swallowed approximately 60 to 70 centimeters, the patient is instructed to lie on his back. The test is performed in this position. The wells will then be upright preventing any draining of the catheters during the test, and also preventing air bubbles from entering the catheters which would result in dampening of pressures.

Other objects and advantages will become more readily apparent from the following detailed description when read in connection with the accompanying drawings, in which:

FIGS. 1a and 1b are top views of the esophageal motility device broken at line 1—1.

FIG. 2 is an enlarged cross-sectional view taken on line 2—2 of FIG. 1.

FIG. 3 is an enlarged cross-sectional view taken on line 3—3 of FIG. 1 showing one of the wells or openings.

FIG. 4 is an enlarged view of the side of the device with part of the tape broken away.

Referring more particularly to the drawings, the esophageal motility device includes a number of hollow tubular catheters 10, 12, 14 and 16 embedded in a latex rubber tape 18. The ends 11, 13, 15 and 17 of the catheters terminate in wells or openings 20, 22, 24 and 26, respectively, which are formed on one surface of the tape. Each of the wells consists of a ring 21, 23, 25 and 27 embedded in the surface of the tape which defines the openings for the wells. The ends of the catheters are sealed in the bottom of the wells flush with the surface in the bottom of the well. Each of the wells or openings has a cross-sectional area equal to approximately eight times the cross-sectional area of the opening in the ends of the catheters. When the tape is placed in position and filled with liquid, pressure fluctuations caused by the peristaltic waves or sphincters will be sensed by the fluid in the well or opening and transferred to the liquid in the catheter.

The opposite ends of the catheters 40, 42, 44 and 46 are connected to transducers 48, 50, 52 and 54 which are in turn connected to amplifiers, an oscilloscope and a photographic recorder (none of which are shown). Pressure fluctuations which are sensed in the wells will then be transferred to the transducers, converted to electrical energy in the transducers and amplified for delivery to the oscilloscope and photographic recorder.

Referring again to FIG. 1a, it should be noted that each of the wells or openings is located a predetermined distance a from the next well. The last well is located a predetermined distance b from a reference scale 70 near the other end of the tape.

In operation the tape is swallowed by the patient until a known point on the reference scale 70 is located opposite the incisors in the mouth of the patient. The patient should be sitting up and the tape swallowed with the wells down. The catheters and well should be filled with a liquid such as water. The patient is then instructed to lie down so that the wells will be upright. When the patient swallows, the duration, pressure and length of the peristaltic wave as it passes each well will be seen and recorded. A pattern of waves will then be seen on the oscilloscope and recorder on the photographic recorder indicating the pressure, length and duration of each wave or high pressure area as it passes the well or opening. The tape is then moved until the reference point 70 is located at a known point. The photographic recorder is again marked to indicate the distance of the wells from the known point. The pattern of peristaltic waves seen on the oscilloscope will indicate the responses of the wells or openings at the new location. This procedure is repeated a number of times until a complete peristaltic wave pattern for the entire esophagus and sphincter areas and their pressures has been established for the patient.

Using a semi-rigid tape which is flat assures that the tape will not twist after it has been swallowed by the patient. The wells or openings will then always be in the same vertical position in the patient. With the catheters embedded in a semi-rigid tape the introduction of foreign pressures such as biting on the tube, tongue movement or body movements into the wave form is prevented.

Although only one embodiment of the invention has been shown and described it should be apparent that vari-

What is claimed is:

1. A device for making esophageal motility studies comprising,
   a flat semi-rigid tape, having a number of spaced openings in one surface,
   a number of tubular members embedded in the tape,
   each of said tubular members having an open end which terminates in one of said openings,
   the other end of each of said tubular members being connected to a transducer means which responds to pressure variations in said openings,
   said openings being spaced at predetermined distances along said tape whereby the length, pressure and duration of peristaltic waves and sphincter areas can be determined.

2. A device according to claim 1 wherein said openings have a cross-sectional area approximately eight times as large as the cross-sectional area of the openings in the end of the tubular members.

3. A device according to claim 1 including a reference means located a predetermined distance from one of said openings whereby the location of said openings can be determined at any time within the patient.

4. A device for recording the characteristics of peristaltic waves in the human body comprising,
   a number of elongate tubes,
   a flat semi-rigid tape for holding said tubes in a fixed relation,
   a number of spaced wells located on one surface of said tape,
   each of said tubes having an open end terminating in one of said wells,
   a liquid in said tubes and wells, and
   transducer means connected to the other end of said tubes to indicate pressure fluctuations on the liquid in said well.

5. A device according to claim 4 wherein the cross-sectional area of said wells is approximately eight times as large as the cross-sectional area of the openings in said tubes.

References Cited

UNITED STATES PATENTS

| | | | |
|---|---|---|---|
| 1,060,665 | 5/1913 | Bell | 128—349 |
| 1,596,754 | 8/1926 | Moschelle | 128—350 |
| 2,541,520 | 2/1951 | Kegel | 128—2 |
| 2,854,982 | 10/1958 | Pagano | 128—348 |
| 2,976,865 | 3/1961 | Shipley | 128—2.05 |
| 3,081,765 | 3/1963 | Kompelien | 128—2 |

FOREIGN PATENTS 1,196,327  7/1965  Germany.

RICHARD A. GAUDET, *Primary Examiner.*

K. L. HOWELL, *Assistant Examiner.*

U.S. Cl. X.R.

73—388; 128—348